June 26, 1945.　　　　J. W. WABER　　　　2,379,122
METHOD OF MAKING INNER TUBES
Filed Feb. 19, 1943　　　2 Sheets-Sheet 1
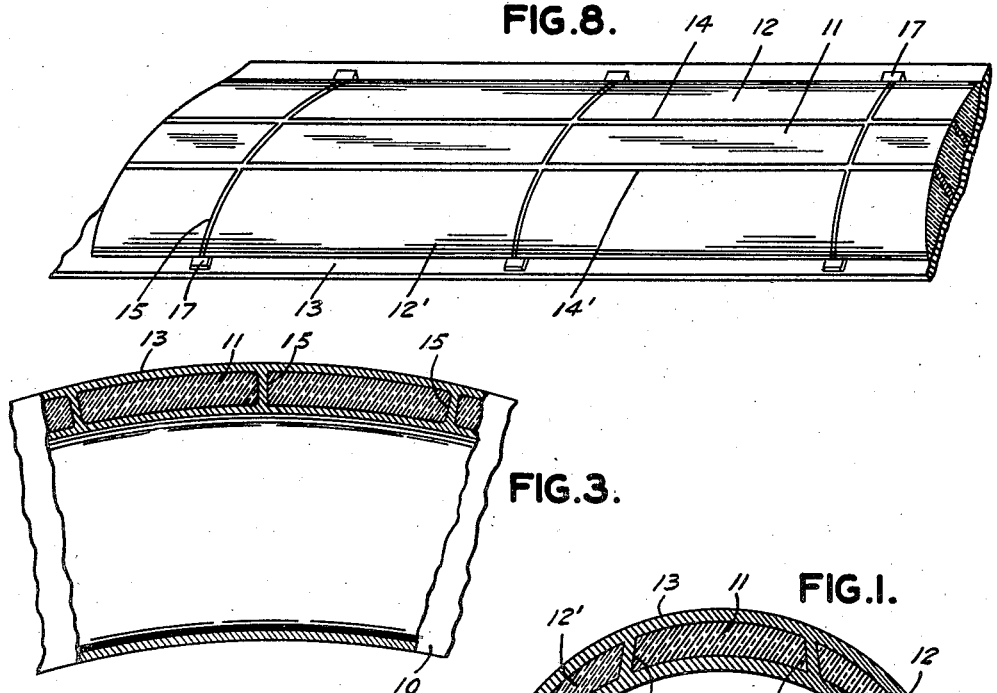
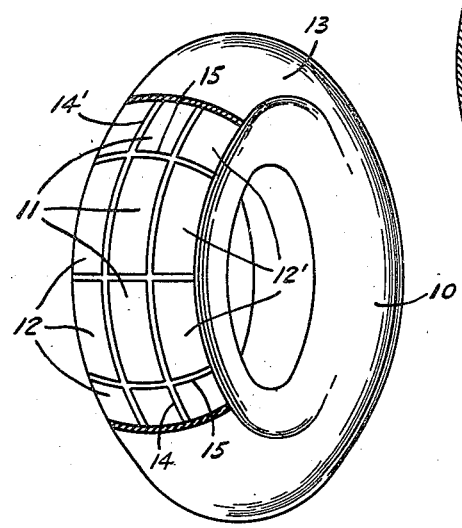
Inventor:
James W. Waber.
By C. P. Soper
Atty.

June 26, 1945.  J. W. WABER  2,379,122

METHOD OF MAKING INNER TUBES

Filed Feb. 19, 1943  2 Sheets-Sheet 2

Inventor:
James W. Waber.
By C. P. Sofer
Atty.

Patented June 26, 1945

2,379,122

UNITED STATES PATENT OFFICE 2,379,122

METHOD OF MAKING INNER TUBES

James W. Waber, Chicago, Ill.

Application February 19, 1943, Serial No. 476,484

5 Claims. (Cl. 154—15)

This invention relates to improvements in inner tubes and particularly to the process of making a tube such as is commonly referred to as a puncture-proof tube, or more accurately as a self-sealing tube.

The present invention relates to a modification of the tubes disclosed in applicant's Patents 1,808,091, 2,033,962 and 2,161,490 and may be made by the methods described in said patents, modified as indicated herein, although its manufacture is not limited to the use of the previously described methods.

The present application is a continuation-in-part of applicant's former invention, Serial No. 442,779, filed May 13, 1942, and the tube and method differs from the tube of the above-noted patents and Patent 2,161,490, in particular, in that the mastic, or unvulcanizable plastic material, is divided transversely as well as longitudinally into a plurality of sections by intervening partitions of vulcanizable material.

When self-sealing tubes, having plastic type compounds in the tread portion thereof, are used in tires on vehicles that are driven continuously at exceedingly high speeds for long periods of time, there is a tendency for the centrifugal force to throw the plastic material toward the center line of the tube and away from the portion of the tube usually termed the "shoulder," causing the plastic material to become of increased thickness at the center of the tread portion and of less thickness at the sides of the tread portion. This action is prevented by the partitions of vulcanizable material shown in Patent No. 2,161,490.

When vehicles, provided with pneumatic tires, having self-sealing tubes, therein, are frequently subjected to sudden changes in speed, either by acceleration or deceleration, as in planes and motorized equipment of the army, there is a tendency to force the mastic material longitudinally, i. e., circumferentially, of the tube and thus cause the tube to have portions wherein the mastic is of less thickness than normally. The tube herein disclosed is designed to prevent any substantial longitudinal movement of the mastic circumferentially of the tube.

The object of the present invention is to provide a method for producing a practical commercial self-sealing tube of the above described character which will be cheap and dependable and readily adaptable to factory conditions of manufacture.

It may be here noted that, due to the nature of the plastic material, displacement thereof does not occur to any distinguishable degree under ordinary conditions of acceleration and deceleration or even at high speeds, when the periods of high speed are interspersed with a fair percentage of periods of average driving speed.

However, there are occasions when it is desirable to have an efficient self-sealing tube of the plastic type that can be successfully used under adverse conditions and the present tube fulfills this requirement.

It is believed the further disclosure of the invention will be readily understood from a detailed description thereof taken in connection with the accompanying drawings in which Fig. 1 shows a cross section of the tube which, so far as it appears in this figure, may be of substantially the same character as that shown in Patent No. 2,161,490;

Fig. 2 is a perspective view of a completed tube with a portion of the external cover layer removed to illustrate the arrangement of the transverse, as well as longitudinal baffles of vulcanizable material in the mastic at the tread portion thereof;

Fig. 3 shows a longitudinal section through a portion of the tread portion of the tube; and Figs. 4, 5, 6, 7 and 8 represent successive steps in carrying out applicant's method as will clearly appear from the following detailed description.

Referring now to the drawings in which like reference characters indicate the same parts in the several views:

Figure 4:
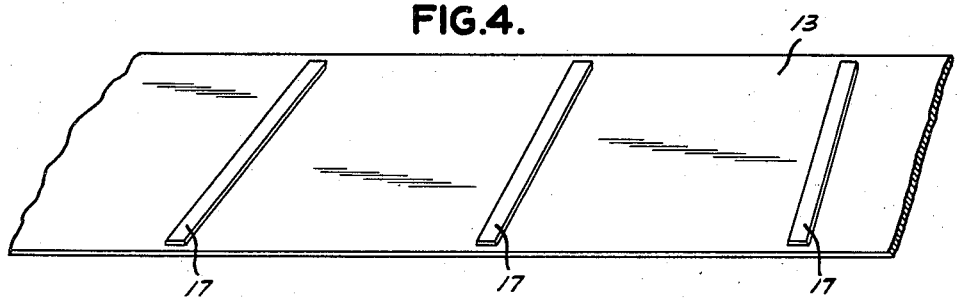

The basic tube 10 of vulcanizable material has applied to the tread portion thereof a puncture-sealing strip of mastic comprising the series of centrally positioned sections 11 and the two series of lateral sections 12 and 12', one series of lateral sections 12 being on one side of the strips 11 and the other series of lateral sections 12' being on the other side of the central strips 11. Overlying the strips 11, 12, and 12' is a cover strip 13, the opposite edges of which are vulcanized to the basic tube 10 as shown in Fig. 1.

The sections 11, 12 and 12' of the mastic or sealing compound are separated by longitudinally extending baffles or partitions 14 and 14' of vulcanizable material and also by the transversely extending partitions 15. In the finished tube, each of the baffles or partitions 14, 14' and 15 has its inner edge fixed by vulcanization to the basic tube 10 and its outer edge secured in like manner to the cover strip 13. It will thus be seen that any substantial movement of the sections 11, 12, and 12' of mastic is prevented.

The method of forming the tube will now be described. Upon a smooth surface, which is slightly longer than the circumference of the tube to be formed, is placed a sheet or strip 13 of vulcanizable material which is, preferably, a little wider than the self-sealing tread portion of the tube. (See Fig. 4.) Upon the strip 13 and transversely thereof are placed strips 17 of similar vulcanizable material. The strips 17 will be arranged in substantially parallel relation and spaced apart any desired distance. In practice, it has been found to give a satisfactory tube if the strips 17 are placed ten to twelve inches apart. The best distance to space these strips will, however, vary somewhat due to variation in the consistency of the mastic and the character of service to which the tube is to be subjected. Although the use of strips 17 is desirable, a satisfactory tube, such as herein contemplated, may be made without using them.

Figure 5:
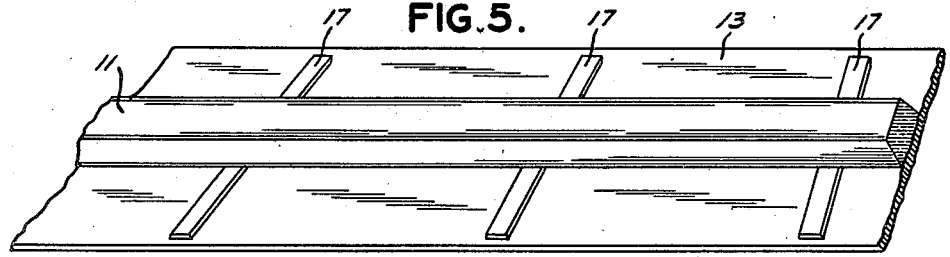
Figure 6:
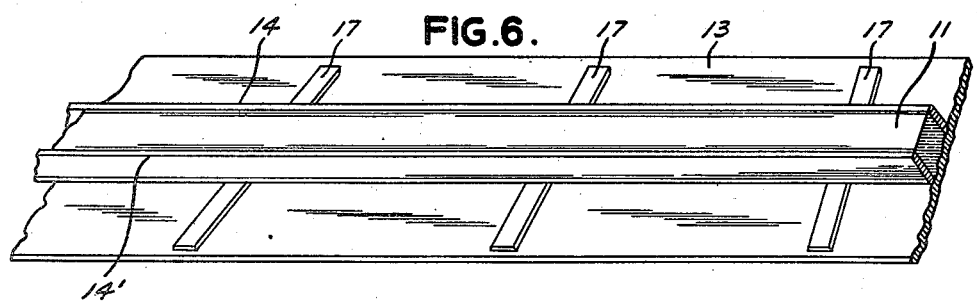

Transversely of the strips 17 and substantially centrally of sheet 13, is placed a strip 11 of mastic or unvulcanizable material, as shown in Fig. 5. This strip 11 is later separated into sections 11 of Fig. 2. As illustrated in Fig. 6, there is next placed at the opposite sides of the strip 11 of mastic, the strips 14 and 14' of vulcanizable material. The strips 14 and 14' are sufficiently wide so that the inner edges thereof engage the strip 13 and the outer edges extend to, or slightly beyond the outer surface of the mastic strip 11' so as to engage the base tube 10 when the tread portion is placed in position thereon, as hereinafter described. Thus, upon vulcanization of the tube, the edges of strips 14 and 14' become firmly vulcanized, respectively, to the basic tube 10 and to the cover strip 13.

Figure 7:
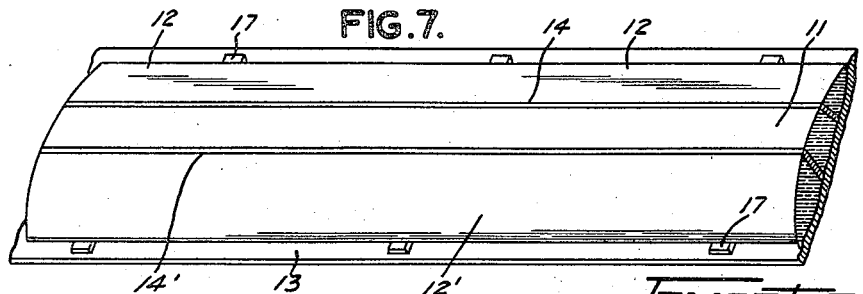

The next step in the process is to place the strips 12 and 12' of mastic at the outer sides of the strips 14 and 14', respectively, as shown in Fig. 7. The strips 12 and 12' later become the sections 12 and 12' of Fig. 2.

By means of either a slicing or shearing action, the strips 11, 12 and 12' of mastic and the partitions 14 and 14' are severed along lines overlying the transverse strips 17 of vulcanizable material. These slits or cuts are successively formed and the transverse baffles or partitions 15 are inserted respectviely therein. The baffles 15, of vulcanizable material, are arranged with their inner edges in contact with the strips 17, respectively, or in contact with sheet 13 if strips 17 are not employed, and the outer edges extending to, or slightly beyond the outer surface of the mastic portion so as to engage the basic tube 10 when the tread portion (Fig. 8) is placed about the tread of the basic tube 10.

The rest of the process may be somewhat similar to that described in applicant's previous patents. The basic tube 10 is inflated and mounted on a building wheel. The built-up tread portion, composed of strips 13, 17, 11, 12, 12', 14, and 14', as shown in Fig. 8, is then positioned about the periphery of the basic tube, with the cover layer 13 outermost and with its lateral edges in engagement with the basic tube 10. The tube is now placed in a mold of the correct size and shape and vulcanized. During vulcanization, the pressure within the tube will be of such a degree as to insure that all the sections of vulcanizable material are brought into close contact at their meeting surfaces so that they will be firmly vulcanized together and the tube will be provided with a smoothly finished outer surface.

Patent No. 2,033,962 discloses the expedient of treating the tread portion of the basic tube 10 which underlies the cover layer, prior to vulcanization, with a vulcanization accelerator to insure a tight cure of this portion of the basic tube. The partitions, or baffles, 14, 14' and 15 may be similarly treated.

The present disclosure shows but two longitudinally extending partitions, which in most cases are sufficient, but if the mastic is of a soft plastic consistency, it may be found desirable to separate the mastic into smaller sections. The process to be followed in such a case, however, will be similar to that hereinbefore described, it being merely necessary to supply additional longitudinally extending baffles and strips.

If the vehicle on which the tires are used is not driven at high speed, but is often subjected to rapid acceleration and deceleration, it may be necessary to employ only the transverse baffles.

While above, the tube has been described as preferably made on an air mandrel, it is believed that its manufacture is not limited to this expedient.

Having thus described my invention, what I claim as new and desire to secure by Letters Patent of the United States is:

1. The method of constructing an inner tube for pneumatic tires which consists in forming a tread portion for said tube by placing upon a supporting surface a cover strip of vulcanizable material slightly longer and broader than the self-sealing tread portion of the tube to be formed, superimposing on said cover strip substantially centrally thereof longitudinally extending alternate strips of sealing compound and separator strips of vulcanizable material, severing said strips of sealing compound and separator strips transversely thereof at spaced intervals, inserting transverse separator strips of vulcanizable material in the slits formed by such severing, said separator strips being arranged to contact the said cover strip at their lower edges and to extend to or beyond said sealing compound at their upper edges, expanding a basic endless tube of vulcanizable material by internal pressure, superimposing upon the periphery of said basic tube, while so expanded, the built up tread portion of said tube with said cover strip of vulcanizable material outermost and curing the whole tube structure, while expanded, in a mold to cause the vulcanizable cover strip to become vulcanized at its lateral edges to the basic tube and causing said separator strips to become vulcanized to said basic tube and to said cover strip at their opposite edges, respectively, and to each other at their points of intersection.

2. The method of constructing an inner tube for pneumatic tires which consists in forming a tread portion for said tube by placing upon a supporting surface a cover strip of vulcanizable material slightly longer and broader than the self-sealing tread portion of the tube to be formed, superimposing on said cover strip substantially centrally thereof longitudinally extending alternate strips of sealing compound and separator strips of vulcanizable material, severing said strips of sealing compound and separator strips transversely thereof at spaced intervals, inserting transverse separator strips of vulcanizable material in the slits formed by such severing, said separator strips being arranged to contact the said cover strip at their lower edges and to extend to or beyond said sealing compound at their upper edges, forming a basic endless tube of vulcanizable material, superimposing upon the periphery of said basic tube, the built up tread portion of said tube with said cover strip of vulcanizable material outermost, placing said basic tube and tread in a mold and expanding said tube by internal pressure and curing the whole tube structure, while expanded, to cause the vulcanizable cover strip to become vulcanized at its lateral edges to the basic tube and causing said separator strips to become vulcanized to said basic tube and to said cover strip at their opposite edges, respectively, and to each other at their points of intersection.

3. The method of constructing an inner tube for pneumatic tires which consists in forming a tread portion for said tube by placing upon a supporting surface a cover strip of vulcanizable material slightly longer and broader than the self-sealing tread portion of the tube to be formed, placing on said cover strip at intervals and transversely thereof narrow strips of vulcanizable material, superimposing on said base strip and transverse strips and substantially centrally thereof longitudinally extending alternate strips of sealing compound and separator strips of vulcanizable material, severing said strips of sealing compound and separator strips along lines overlying said narrow strips of sealing compound, inserting transverse separator strips of vulcanizable material in the slits formed by such severing, said separator strips being arranged to contact the said cover strip and said transverse strips at their lower edges and to extend to or beyond said sealing compound at their upper edges, expanding a basic endless tube of vulcanizable material by internal pressure, superimposing upon the periphery of said basic tube, while so expanded, the built up tread portion of said tube with said cover strip of vulcanizable material outermost and curing the whole tube structure, while expanded, in a mold to cause the vulcanizable cover strip to become vulcanized to the basic tube at its lateral edges and causing said separator strips to become vulcanized to said basic tube and to said cover strip at their opposite edges, respectively, and to each other at the points of their intersection.

4. The method of constructing an inner tube for pneumatic tires which consists in forming a tread portion for said tube by placing upon a supporting surface a cover strip of vulcanizable material slightly longer and broader than the self-sealing tread portion of the tube to be formed, placing on said cover strip at intervals and transversely thereof narrow strips of vulcanizable material, superimposing on said cover strip and transverse strips and substantially centrally thereof longitudinally extending alternate strips of sealing compound and separator strips of vulcanizable material, severing said strips of sealing compound and separator strips along lines overlying said narrow strips of vulcanizable material, inserting transverse separator strips of vulcanizable material in the slits formed by such severing, said separator strips being arranged to contact the said cover strip and said transverse strips at their lower edges and to extend to or beyond said said sealing compound at their upper edges, forming a basic endless tube of vulcanizable material, superimposing upon the periphery of said basic tube the built up tread portion of said tube with said cover strip of vulcanizable material outermost and curing the whole tube structure, while expanded, in a mold to cause the vulcanizable cover strip to become vulcanized, at its lateral edges, to the basic tube and causing said separator strips to become vulcanized to said basic tube and to said cover strip at their opposite edges, respectively, and to each other at their points of intersection.

5. The method of constructing an inner tube for pneumatic tires which consists in forming a tread portion for said tube by placing upon a supporting surface a cover strip of vulcanizable material somewhat longer and wider than the self-sealing tread portion of the tube to be formed, superimposing on said cover strip and substantially centrally thereof a puncture-sealing strip consisting of alternate sections of sealing compound and transversely extending separator strips of vulcanizable material, said separator strips being arranged to contact the said cover strip at their lower edges and to extend to or beyond said sealing compound at their upper edges, forming a basic endless tube of vulcanizable material, placing said endless tube on a building wheel, superimposing upon the periphery of said basic tube, the built up tread portion of said tube with said cover strip of vulcanizable material outermost and curing the whole tube structure in a mold to cause the vulcanizable cover strip to become vulcanized to the basic tube at its lateral edges and causing said separator strips to become vulcanized to said basic tube and to said cover strip at their opposite edges, respectively.

JAMES W. WABER.